United States Patent
Kimata et al.

(10) Patent No.: US 8,363,985 B2
(45) Date of Patent: Jan. 29, 2013

(54) IMAGE GENERATION METHOD AND APPARATUS, PROGRAM THEREFOR, AND STORAGE MEDIUM WHICH STORES THE PROGRAM

(75) Inventors: Hideaki Kimata, Yokosuka (JP); Shinya Shimizu, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 475 days.

(21) Appl. No.: 12/682,026

(22) PCT Filed: Oct. 9, 2008

(86) PCT No.: PCT/JP2008/068399
§ 371 (c)(1),
(2), (4) Date: Apr. 7, 2010

(87) PCT Pub. No.: WO2009/051065
PCT Pub. Date: Apr. 23, 2009

(65) Prior Publication Data
US 2010/0209016 A1 Aug. 19, 2010

(30) Foreign Application Priority Data
Oct. 15, 2007 (JP) ................................. 2007-267927

(51) Int. Cl.
*G06K 9/32* (2006.01)
(52) U.S. Cl. ........ 382/299; 382/274; 382/275; 382/300; 358/3.26; 358/3.27; 358/525
(58) Field of Classification Search .................. 382/274, 382/275, 282, 290, 299, 300; 358/3.26, 3.27, 358/463, 525, 538
See application file for complete search history.

(56) References Cited

U.S. PATENT DOCUMENTS
5,583,665 A * 12/1996 Gregory et al. ............... 358/504
(Continued)

FOREIGN PATENT DOCUMENTS
JP 9-218954 A 8/1997
JP 10-134187 A 5/1998
(Continued)

OTHER PUBLICATIONS

Keita Takahashi and Takeshi Naemura, "Layered Light-Field Rendering with Focus Measurement", EURASIP Signal Processing: Image Communication, vol. 21, No. 6, pp. 519-530 (Jul. 2006) (in English).

M. Droese, T. Fujii and M. Tanimoto, "Ray-Space Interpolation Constraining Smooth Disparities Based on Loopy Belief Propagation", Proc. of IWSSIP2004, pp. 247-250, Poznan, Poland, Sep. 2004 (in English).

(Continued)

*Primary Examiner* — Yosef Kassa
(74) *Attorney, Agent, or Firm* — Harness, Dickey & Pierce, P.L.C.

(57) ABSTRACT

An image generation method for generating image information of an image C by using an image A and an image B having a resolution higher than that of image A. Image C having the same resolution as image B is generated by enlarging image A; presence or absence of a point in image B corresponding to each pixel position of image C and the position of the relevant corresponding point are estimated; and to each pixel position in image C for which it is estimated that there is a corresponding point, image information of the corresponding position in image B is assigned. It is possible to generate image information at each pixel position in image C for which it is estimated in the corresponding point estimation that there is no corresponding point, by using the image information assigned according to an estimation result that there is a corresponding point.

22 Claims, 10 Drawing Sheets

U.S. PATENT DOCUMENTS

| | | | |
|---|---|---|---|
| 5,859,712 A * | 1/1999 | Kim | 358/504 |
| 6,847,392 B1 | 1/2005 | House | |
| 6,993,167 B1 * | 1/2006 | Skladnev et al. | 382/128 |
| 7,222,306 B2 * | 5/2007 | Kaasila et al. | 715/801 |
| 7,671,922 B2 * | 3/2010 | Leone et al. | 348/453 |
| 2006/0154559 A1 | 7/2006 | Yoshida | |

FOREIGN PATENT DOCUMENTS

| | | |
|---|---|---|
| JP | 2001-067473 A | 3/2001 |
| KR | 10-2005-0035566 A | 4/2005 |
| RU | 2 178 907 C2 | 1/2002 |
| WO | 98/33141 A1 | 7/1998 |
| WO | 00/46568 A2 | 8/2000 |

OTHER PUBLICATIONS

Takashi Matsuyama, Takeshi Takai, Xiaojunn Wu and Shohei Nobuhara, "Generation, Editing, and Visualization of 3D Video", Proceedings of The Virtual Reality Society of Japan, vol. 7, No. 4, pp. 521-532, Dec. 2002 (with English Abstract).

Masayuki Tanaka and Masatoshi Okutomi, "A Fast Algorithm for Reconstruction-Based Super-Resolution and its Accuracy Evaluation", Proceedings of IEICE, D-II vol. J88-D-II, No. 11, pp. 2200-2209, 2005 (in Japanese).

* cited by examiner

IMAGE GENERATION METHOD AND APPARATUS, PROGRAM THEREFOR, AND STORAGE MEDIUM WHICH STORES THE PROGRAM

TECHNICAL HELD

The present invention relates to a technique for generating an image having a high resolution by using a plurality of images.

Priority is claimed on Japanese Patent Application No. 2007-267927, filed Oct. 15, 2007, the contents of which are incorporated herein by reference.

BACKGROUND ART

For multi-view imaging systems, FIG. 11 is a diagram showing an example of camera arrangement having a straight-line alignment, FIG. 12 is a diagram showing another example of camera arrangement having a planar arrangement, FIG. 13 is a diagram showing another example of camera arrangement having an arc arrangement, and FIG. 14 is a diagram showing another example of camera arrangement having a spherical arrangement.

The multi-view imaging systems for imaging a scene in different directions have been developed. In the multi-view imaging systems, the camera arrangement has various forms such as a one-dimensional arrangement on a straight line as shown in FIG. 11, a two-dimensional arrangement on a plane as shown in FIG. 12, an arc arrangement as shown in FIG. 13, or a spherical arrangement as shown in FIG. 14. Using such multi-view imaging systems makes it possible to archive video scenes in many directions.

In addition, there is a technique called "image synthesis" for generating image information at a virtual camera position (at which imaging is not performed) by using camera images obtained by multi-view imaging. In the image synthesis, it is assumed that a camera parameter which indicates the spatial direction in which the original video image was obtained is known. The image synthesis can be performed by various methods.

For example, there is a method of performing synthesis by estimating depth information. First, disparity information is obtained by searching corresponding points between original video images, and depth information of the relevant scene is estimated based on the disparity information. Then, depth information at the virtual camera position is estimated, and corresponding image information is generated using image information of the original cameras (see Non-Patent Document 1).

In another example of the methods, no estimation of depth information is performed, but image information at the virtual camera position is directly generated using disparity information of original images (see Non-Patent Document 2).

In another example, a plurality of camera images are used for estimating a three-dimensional model information of an object which is present in the relevant scene, and an image of the model projected from the virtual camera position is generated (see Non-Patent Document 3).

In the above-described imaging systems, cameras having the same resolution are generally used, however, those having different resolutions may be used. It is possible to reduce the amount of obtained image information by using a combination of a camera having a high resolution and a camera having a low resolution. In addition, the cameras may have different focusing positions or viewing angles. In such a case, even when each image signal to be obtained has the same resolution, each area which is actually imaged has an individual resolution.

To obtain an image having a high resolution based on an image having a low resolution, an enlarging method of applying an up-sampling filter to each image signal in an image having a low resolution and a super-resolution method are known.

In the enlarging method, an image signal is obtained by applying an appropriate filter to image signals in a peripheral area. In the super-resolution method, generally, information of a plurality of images having the same resolution, which were sequentially obtained, is used (see Non-Patent Document 4). First, an image having a resolution higher than the obtained image is defined as a target image. That is, each pixel position of a target to be generated is defined in advance. Next, a corresponding relationship between the obtained images is estimated, and each image signal obtained by imaging is assigned to the corresponding target pixel position, thereby obtaining image information having a high resolution.

Non-Patent Document 1: Keita Takahashi and Takeshi Naemura, "Layered Light-Field Rendering with Focus Measurement", EURASIP Signal Processing: Image Communication, vol. 21, no. 6, pp. 519-530 (2006.7).

Non-Patent Document 2: M. Droese, T. Fujii and M. Tanimoto, "Ray-Space Interpolation Constraining Smooth Disparities Based On Loopy Belief Propagation", Proc. of IWSSIP2004, pp. 247-250, Poznan, Poland, September 2004.

Non-Patent Document 3: Takashi Matsuyama, Takeshi Takai, Xiaojunn Wu, and Shohei Nobuhara, "Generation, Editing, and Visualization of 3D Video", Proceedings of The Virtual Reality Society of Japan, Vol. 7, No. 4, pp. 521-532, 2002.12.

Non-Patent Document 4: Masayuki Tanaka and Masatoshi Okutomi, "A Fast Algorithm for Reconstruction-Based Super-Resolution and Its Accuracy Evaluation", Proceedings of IEICE, D-II vol. J88-D-II, No. 11, pp. 2200-2209, 2005.

DISCLOSURE OF INVENTION

Problem to be Solved by the Invention

For a novel technique found by the inventors of the present invention for processing a multi-view image having different resolutions, an object of the present invention is to restore high-frequency information which a low resolution image does not have, thereby increasing the resolution of an image which was obtained with a low resolution and has a subjective image quality lower than an image having a high resolution, while also providing a desirable image quality to the relevant image.

Means for Solving the Problem

In conventional techniques, a multi-view video image including different resolutions is not handled. That is, the object of the present invention is generated from a novel technical concept of handling a multi-view video image including different resolutions.

When using cameras having different resolutions in a multi-view imaging system, both an image having a high resolution and an image having a low resolution are present. Even when using cameras having the same resolution, the amount of information can be reduced by decreasing the resolution of a part of the cameras, which is preferable for the compression of a multi-view image. Also in such a case, both an image having a high resolution and an image having a low resolution are present.

In the above cases, image information corresponding to a low resolution does not have a high-frequency component. Therefore, in comparison with image information of a camera position at which imaging was performed with a high resolution, image information of a camera position at which imaging was performed with a low resolution has a low subjective image quality.

The present invention solves such a problem, and restores high-frequency information which an image of a low resolution has lost, thereby increasing the resolution of an image which was obtained with a low resolution and has a subjective image quality lower than an image having a high resolution, while also providing a desirable image quality to the relevant image.

The present invention will be generally explained. For example, the total amount of image information to be processed can be reduced by imaging a scene using a plurality of cameras having different resolutions. Therefore, in this case, the amount of code of a multi-view video image can be considerably reduced. However, a camera image obtained with a low resolution has a low subjective image quality in comparison with an image having a high resolution.

The present invention solves the above problem by increasing the resolution of such a image obtained with a low resolution while providing a desirable image quality to the relevant image. In conventional techniques, a multi-view video image having different resolutions is not handled. The object of the present invention is generated from a novel technical concept of handling a multi-view video image including different resolutions.

More specifically, as shown in the embodiments described later, the present invention can be applied, not only to a multi-view video image including different resolutions, but also to a video image having different resolutions between frames input by a single camera.

Basically, the present invention provides a way for restoring high-frequency information which an image having a low resolution has lost, thereby reducing the total amount of image signals to be processed when handling a multi-view video image having different resolutions. That is, it is possible to considerably reduce the amount of code of a multi-view video image.

As described above, to increase the number of pixels in an image having a low resolution, that is, increase the resolution of the image, a method of enlarging an image signal by using an up-sampling filter and a super-resolution technique for producing a high-resolution image using an image signal of another image are known. Among them, the image signal enlarging method cannot obtain the lost high-frequency information. The super-resolution method can obtain the lost high-frequency information, but the specific method and a target object therefor differ from those of the present invention.

For the super-resolution method, there must be a plurality of image information items having a low resolution. In a target image having a high resolution, each pixel position is defined, and image information having a low resolution is assigned to the pixel position. Therefore, the super-resolution method is a technique of generating an image, which is originally not present, by means of synthesis.

In contrast, the present invention has a substantially different problem to be solved in comparison with the super-resolution method, and the point of the invention is to restore a high-frequency component which image information of a low resolution originally has. The relevant generation is performed using corresponding image information in another image having a high resolution, where the original low-resolution image information is used only for searching for each corresponding point. To an image obtained by enlarging the image having the low resolution, image information of a corresponding high-resolution image is applied. Such a technical method basically differs from the concept of the super-resolution method.

In order to solve the above-described problem, the present invention provides an image generation method for generating image information of an image C by using an image A and an image B having a resolution higher than that of image A, the method comprising:

an image enlarging step that generates image C having the same resolution as image B by enlarging image A;

a corresponding point estimating step that estimates presence or absence of a point in image B corresponding to each pixel position of image C and also estimates the position of the relevant corresponding point; and a corresponding image assigning step that assigns, to each pixel position in image C for which the corresponding point estimating step estimates that there is a corresponding point, image information of the corresponding position in image B.

In accordance with the above image generation method, it is possible to generate an image having a high resolution corresponding to a desired image having a low resolution by using high-frequency information included in another image. If the other image does not have an image signal corresponding to a target pixel position for the generation, image information having a resolution increased from the original low resolution can be used for preventing missing of image information.

In the corresponding point estimation, corresponding point information may be provided as input data, or each corresponding point may be searched for by using image information. When providing the corresponding point information as input data, depth information or geometric information of the relevant scene may be estimated in advance, and then corresponding points between the images may be estimated.

When searching for each corresponding point, the absolute value of each difference between corresponding pixels (i.e., between each pixel of image C and one or more pixel candidates of image B) may be computed. When the minimum absolute value is smaller than or equal to a predetermined threshold, a point which produces the minimum value may be estimated to be a corresponding point. When the minimum absolute value is larger than the threshold, it may be estimated that there is no corresponding point.

It is also preferable to store the threshold together with the relevant image information having a low resolution by means of filing. When generating image information having a high resolution using the stored image information having the low resolution, the same image can always be generated by using the threshold included in the relevant file.

When imaging a scene in a plurality of directions by using cameras having different resolutions, an image having a high resolution corresponding to an image of a camera having a low resolution can be generated using an image of another camera having a high resolution. This method can be applied not only to a multi-view image but also to a video image obtained by a single camera. That is, when frames in a video image have different resolutions, an image having a high resolution corresponding to an image of a frame having a low resolution can be generated using an image of another frame having a high resolution.

The above method may further comprise an image interpolation step that generates image information at each pixel position in image C for which the corresponding point estimating step estimates that there is no corresponding point, by means of interpolation using the image information assigned by the corresponding image assigning step.

In this case, when the relevant other image does not have an image signal corresponding to a target pixel position for the generation, target image information is generated by means of interpolation using an already-generated image signal having the high resolution at a peripheral position, thereby preventing missing of image information.

The present invention also provides an image generation method for generating image information of an image C by using an image A and an image B having a resolution higher than that of image A, the method comprising:

an image enlarging step that generates an image D having the same resolution as image B by enlarging image A;

a corresponding point estimating step that estimates presence or absence of a point in image B corresponding to each pixel position of image D and also estimates the position of the relevant corresponding point;

a corresponding image assigning step that assigns, to a pixel position in an image E equal to each pixel position in image D for which the corresponding point estimating step estimates that there is a corresponding point, image information of the corresponding position in image B;

an image interpolation step that generates image information at a pixel position in image E equal to each pixel position in image D for which the corresponding point estimating step estimates that there is no corresponding point, by means of interpolation using the image information assigned by the corresponding image assigning step;

an image reducing step that generates an image F having the same resolution as image A by reducing image E;

a difference generating step that computes a difference between image information at each pixel position in image A and image information at the same pixel position in image F; and an image information assigning step wherein:

when the difference at each pixel position computed by the difference generating step is smaller than or equal to a threshold, the image information assigning step assigns image information of image E to each corresponding pixel position in image C, and, when the difference at each pixel position computed by the difference generating step is larger than the threshold, the image information assigning step assigns image information based on image information of image D to each corresponding pixel position in image C.

In a typical example, when the difference at each pixel position computed by the difference generating step is larger than the threshold:

(i) the image information assigning step assigns the image information of image D to each corresponding pixel position in image C, or (ii) the image information assigning step assigns a weighted average between the image information of image D and the image information of image E to each corresponding pixel position in image C.

In accordance with the above image generation method, if there is an error in the corresponding point estimation between a desired image having a low resolution and another image, then instead of using an image having a high resolution generated by a method based on the above-described invention, (i) image information obtained by increasing the original low resolution to have the high resolution, or (ii) a weighted average between the generated image information having the high resolution and the image information obtained by increasing the original low resolution to have the high resolution, may be used for reducing degradation of image quality due to estimation error.

The present invention also provides an image generation method for generating image information of an image C by using an image A and an image B which have the same resolution, the method comprising:

a reference image reducing step that generates an image G having a resolution lower than that of image A by reducing image A;

an image enlarging step that generates an image D having the same resolution as image A by enlarging image G;

a corresponding point estimating step that estimates presence or absence of a point in image B corresponding to each pixel position of image D and also estimates the position of the relevant corresponding point;

a corresponding image assigning step that assigns, to a pixel position in an image E equal to each pixel position in image D for which the corresponding point estimating step estimates that there is a corresponding point, image information of the corresponding position in image B;

an image interpolation step that generates image information at a pixel position in image E equal to each pixel position in image D for which the corresponding point estimating step estimates that there is no corresponding point, by means of interpolation using the image information assigned by the corresponding image assigning step;

an image reducing step that generates an image F having the same resolution as image G by reducing image E;

a difference generating step that computes a difference between image information at each pixel position in image G and image information at the same pixel position in image F;

a threshold setting step that sets a threshold;

an image information assigning step wherein:

when the difference at each pixel position computed by the difference generating step is smaller than or equal to a threshold, the image information assigning step assigns image information of image E to each corresponding pixel position in image C, and, when the difference at each pixel position computed by the difference generating step is larger than the threshold, the image information assigning step assigns image information based on image information of image D to each corresponding pixel position in image C;

a generated difference summing step that computes the sum of differences in image information at the relevant pixel positions between image C obtained by the image information assigning step and image A; and a threshold determination step that determines the threshold which produces the minimum value in the sums of the differences computed by the generated difference summing step based on a result of repetition of the image information assigning step and the generated difference summing step while changing the threshold set by the threshold setting step within a predetermined range.

In a typical example, when the difference at each pixel position computed by the difference generating step is larger than the threshold:

(i) the image information assigning step assigns the image information of image D to each corresponding pixel position in image C, or (ii) the image information assigning step assigns a weighted average between the image information of image D and the image information of image E to each corresponding pixel position in image C.

In accordance with the above image generation method, in conversion of the resolution of an image to a low value then to a high value, when generating the image having the high resolution by the above-described method, the magnitude of degradation due to an error in the corresponding point estimation is measured, and a threshold for selecting the generated image having the high resolution can be determined while minimizing the degradation. The magnitude of the degradation can be measured because there is also image information of the original high resolution.

The threshold parameter can be used as explained below. After the threshold is estimated, the value is appended as a threshold parameter to image information of a low resolution. For example, the threshold parameter is also stored in a file together with the image having the low resolution and another relevant image. No image information relating to an image before the conversion to the low resolution is included in the file. Therefore, image information having a resolution lower than the original image is subjected to filing, which decreases the file size. When reading the file, an image having the high resolution can be generated based on the image of the low resolution and the other image by using the above threshold parameter, where the image having the high resolution has a minimum degradation in the subjective image quality.

In addition, when the difference at each pixel position computed by the difference generating step is larger than the threshold and the above method (ii) is used, the image obtained by enlarging an image having a low resolution is not applied to the signal of the generated image, but a weighted average between the enlarged image and the image originally having a high resolution is used. Therefore, it is possible to reduce blur in an image due to the enlargement of an image having a low resolution.

The present invention also provides image generation apparatuses which generates images in accordance with the above methods.

Effect of the Invention

In accordance with the present invention, for image information obtained at a camera position having a low resolution, image information having a high resolution can be generated using image information obtained at a camera position having a high resolution, thereby reducing degradation in the subjective image quality.

REFERENCE SYMBOLS

Figure 1:
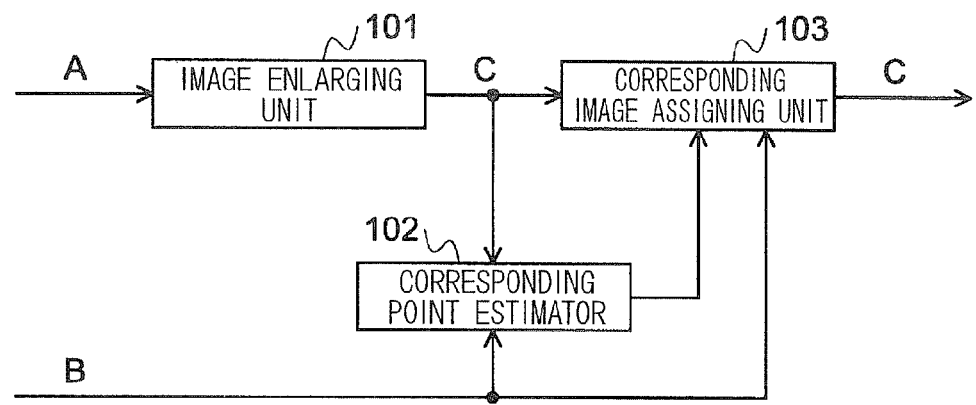
FIG. 1 is a diagram showing the structure of an image generation apparatus as a first embodiment of the present invention.

101, 201, 301, 401 image enlarging unit
102, 202, 302, 402 corresponding point estimator
103, 203, 303, 403 corresponding image assigning unit
204, 304, 404 image interpolator
305, 405 image reducing unit
306, 406 difference generator
307, 407 image selector
308, 408 image generator
409 generated difference summing unit
410 threshold setting unit
411 threshold determination unit
412 reference image reducing unit

BEST MODE FOR CARRYING OUT THE INVENTION

Embodiment of the image generation apparatus of the present invention will be shown with reference to the drawings.

First Embodiment

In a first embodiment, an image A having a low resolution and an image B having a high resolution, which were obtained by different cameras, are used for generating an image C which corresponds to image A but has a high resolution (corresponding to the high resolution of image B). Here, color of all signals obtained by cameras is set using YUV signals (i.e., luminance signal Y and chrominance signals U and V). In the present embodiment, only the signal Y is processed.

FIG. 1 shows a general structure of the apparatus. That is, the image generation apparatus of the present embodiment has an image enlarging unit 101 for enlarging image A so as to generate image C having the same resolution as image B, a corresponding point estimator 102 for estimating presence or absence of a point in image B corresponding to each pixel position of image C and also for estimating the position of the relevant corresponding point, and a corresponding image assigning unit 103 for assigning, to each pixel position in image C for which the corresponding point estimator 102 estimates that there is a corresponding point, image information of the corresponding position in image B.

The image enlarging unit 101 generates the enlarged image by obtaining image information at fractional positions by means of bilinear interpolation.

The corresponding point estimator 102 uses camera parameters or a known matching technique for assuming one or more candidates of a pixel (in image B) corresponding to each pixel in image C, and computes an absolute value of the difference between each pair of corresponding pixels. When the minimum value of the computed absolute value(s) is smaller than or equal to a predetermined threshold, the corresponding point estimator 102 estimates the point which produces the minimum value to be the corresponding point. When the minimum value of the computed absolute value(s) is larger than the predetermined threshold, the corresponding point estimator 102 estimates that there is no point corresponding to the relevant pixel in image C.

Figure 2:
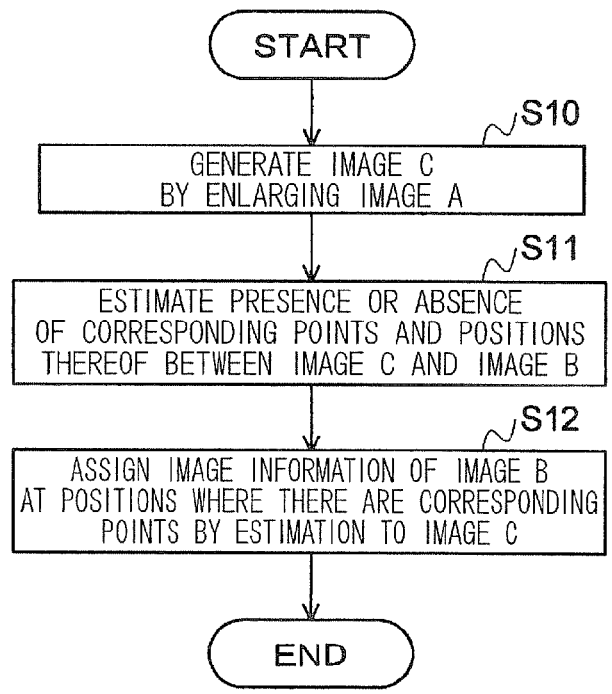
FIG. 2 is a flowchart showing the operation of the image generation apparatus of the embodiment.

Based on the above premise, the image generation apparatus in FIG. 1 operates as explained below. FIG. 2 is a flowchart showing the operation.

First, the image enlarging unit 101 generates image C by enlarging image A as described above (see step S10). The corresponding point estimator 102 estimates the presence or absence of the corresponding points and positions thereof between image C and image B by means of the above-described method (see step S11). To each pixel of image C for which the corresponding point estimator 102 estimates that there is a corresponding point, the corresponding image assigning unit 103 assigns image information of the corresponding point in image B (see step S12). Image C is generated by the above operation.

The image enlarging unit 101 may use a filter having a large number of taps or a two-dimensional filter, or may use a one-dimensional filter in the horizontal direction and then in the vertical direction. The image enlarging unit 101 may also use a filter which stores edge information. In either case, a process of increasing the resolution is performed using image information of image A (target image to be enlarged) without using image B.

The corresponding point estimator 102 computes the absolute value of each difference between the relevant pixels in the above operation. However, estimation may be performed using a block consisting of a plurality of pixels whose center pixel is the target pixel for estimation. For example, for each pixel in image C, one or more candidates of a corresponding pixel in image B are assumed, and the total sum of absolute values of differences from a plurality of pixels which form a block and whose center is each candidate. The position of the candidate which produces the minimum value of the total sums may be estimated to be the corresponding point.

In the above example, image A having a low resolution and image B having a high resolution, which were obtained by different cameras, are used for generating image C having the high resolution. However, an image A having a low resolution and an image B having a high resolution, which were obtained by a common camera at different times, may be used for generating an image C having the high resolution.

In addition, although image A and image B are used for generating image C in the above operation, a plurality of images B may be used. An example of using two images B (B1 and B2) will be shown below. The operation of the image generation apparatus in this case will be explained while the structure is the same as the above.

First, the image enlarging unit 101 generates image C by enlarging image A as described above. The corresponding point estimator 102 estimates the presence or absence of the corresponding points and positions thereof between image C and image B1 by means of the above-described method. To each position of image C for which the corresponding point estimator 102 estimates that there is a corresponding point, the corresponding image assigning unit 103 assigns image information of the corresponding position in image B1.

Similarly, the corresponding point estimator 102 estimates the presence or absence of the corresponding points and positions thereof between image C and image B2. To each position of image C for which the corresponding point estimator 102 estimates that there is a corresponding point, the corresponding image assigning unit 103 assigns image information of the corresponding position in image B2.

Image C is generated by the above operation.

If it is estimated that there are corresponding points in both images B1 and B2, (i) priority may be given to any predetermined one of B1 and B2 for assigning image information thereof to image C, (ii) image information of B1 or B2 which has smaller difference from the corresponding pixel in image C may be assigned to image C, or (iii) an average of image information of images B1 and B2 may be assigned to image C.

When there are three or more images B, an image C having a high resolution can also be generated similarly.

In other embodiments explained below, when there are a plurality of images B, a similar operation can be performed.

Second Embodiment

Similar to the first embodiment, in a second embodiment, an image A having a low resolution and an image B having a high resolution, which were obtained by different cameras, are used for generating an image C which corresponds to image A but has the high resolution. However, if no corresponding point is found, image generation is performed by means of interpolation using image information of peripheral pixels having the high resolution.

Figure 3:
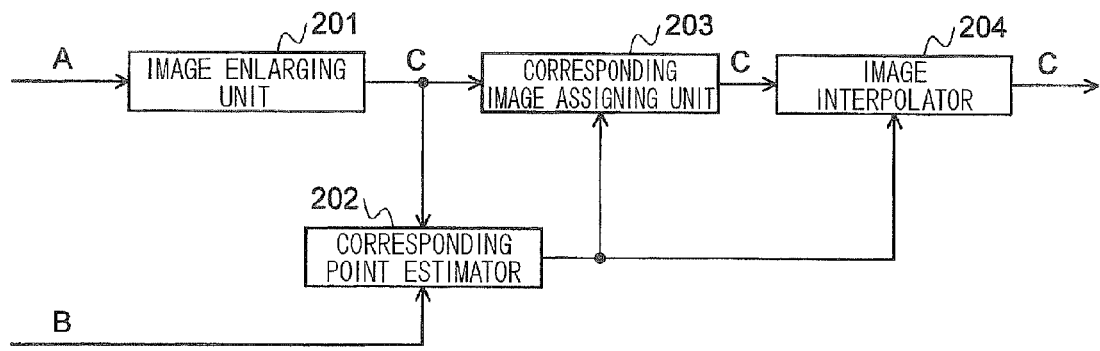
FIG. 3 is a diagram showing the structure of an image generation apparatus as a second embodiment of the present invention.

FIG. 3 shows a general structure of the apparatus. That is, the image generation apparatus of the present embodiment has an image enlarging unit 201 for increasing the resolution of image A so as to generate image C, a corresponding point estimator 202 for estimating presence or absence of a point in image B corresponding to each pixel position of image C and also estimating the position of the relevant corresponding point, a corresponding image assigning unit 203 for assigning, to each pixel position in image C for which the corresponding point estimator 202 estimates that there is a corresponding point, image information of the corresponding position in image B, and an image interpolator 204 for generating image information at each pixel position in image C for which the corresponding point estimator 202 estimates that there is no corresponding point, by using the image information assigned by the corresponding image assigning unit 203.

The image interpolator 204 generates the image information at each pixel position in image C for which it is estimated that there is no corresponding point, by using the image information at pixel positions in image B, which was assigned due to an estimation result that there are corresponding points. More specifically, linear interpolation is performed in accordance with distances measured from the pixel positions to which the image information in image B was assigned.

Figure 4:
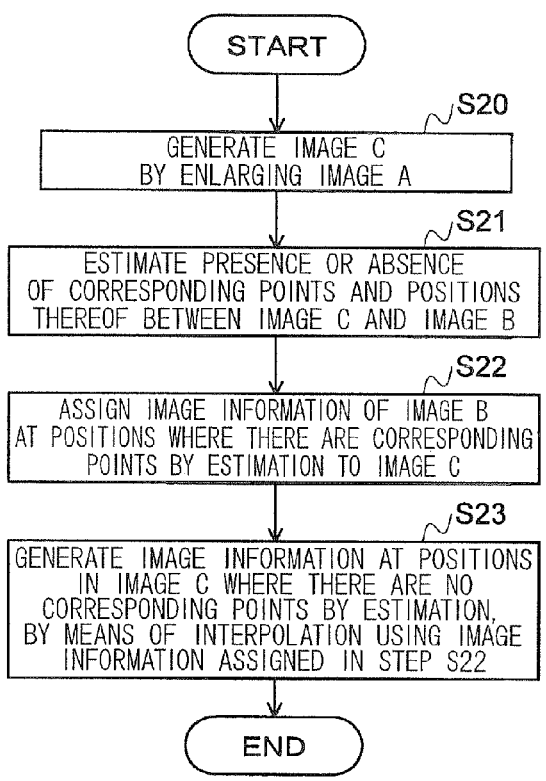
FIG. 4 is a flowchart showing the operation of the image generation apparatus of the embodiment.

Based on the above premise, the image generation apparatus operates as explained below. FIG. 4 is a flowchart showing the operation.

First, the image enlarging unit 201 generates image C by increasing the resolution of image A (see step S20). The corresponding point estimator 202 estimates the presence or absence of the corresponding points and positions thereof between image C and image B (see step S21). To each pixel of image C for which the corresponding point estimator 202 estimates that there is a corresponding point, the corresponding image assigning unit 203 assigns image information of the corresponding point in image B (see step S22). For each pixel position for which the corresponding point estimator 202 estimates that there is no corresponding point, the image interpolator 204 generates image information by means of interpolation using the image information which was already assigned by the corresponding image assigning unit 203 (see step S23). Image C is generated by the above operation.

The image interpolator 204 generates the relevant image information by means of linear interpolation in the above operation. However, the image information may be generated through a non-linear process. In either case, the image information is generated using the image information which was already assigned by the corresponding image assigning unit 203.

Third Embodiment

Similar to the first embodiment, in a third embodiment, an image A having a low resolution and an image B having a high resolution, which were obtained by different cameras, are used for generating an image C which corresponds to image A but has the high resolution (corresponding to that of image B). However, generated image information is applied only to each pixel position at which difference between the original image A and a reduced image of the generated image information is small.

In the following example, an image D is an image obtained by enlarging (i.e., increasing the resolution of) image A in the first step, and an image E is a temporary image for processing and has the same size (same pixel structure) as image D.

In addition, an image F is generated by reducing image E and is a temporary image (for processing) having the low resolution (i.e., the same resolution as image A).

Figure 5:
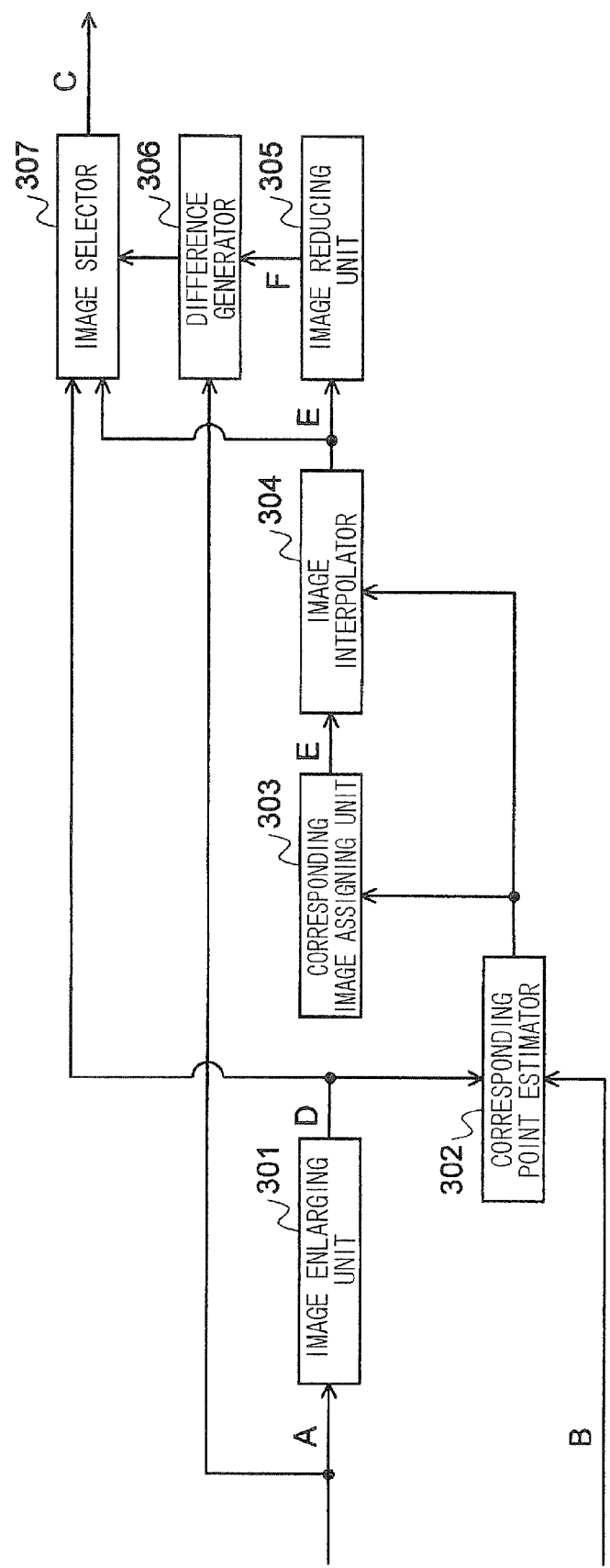
FIG. 5 is a diagram showing the structure of an image generation apparatus as a third embodiment of the present invention.

FIG. 5 shows a general structure of the apparatus. That is, the image generation apparatus of the present embodiment has an image enlarging unit 301 for enlarging (i.e., increasing the resolution of) image A so as to generate image D, a corresponding point estimator 302 for estimating presence or absence of a point in image B corresponding to each pixel position of image D and also estimating the position of the relevant corresponding point, a corresponding image assigning unit 303 for assigning, to a pixel position in image E equal to each pixel position in image D for which the corresponding point estimator 302 estimates that there is a corresponding point, image information of the corresponding position in image B, an image interpolator 304 for generating image information at a pixel position in image E equal to each pixel position in image D for which the corresponding point estimator 302 estimates that there is no corresponding point, by using the image information assigned by the corresponding image assigning unit 303, an image reducing unit 305 for reducing (i.e., decreasing the resolution of) image E so as to generate image F having the low resolution, a difference generator 306 for computing a difference between image information at each pixel position in image A and image information at the same pixel position (as the pixel position in image A) in image F, and an image selector 307. When the difference at each pixel position computed by the difference generator 306 is small, the image selector 307 assigns the relevant image information of image E to each corresponding pixel position in image C. When the difference at each pixel position computed by the difference generator 306 is large, the image selector 307 assigns the relevant image information of image D to each corresponding pixel position in image C.

The image reducing unit 305 generates the reduced image (i.e., image F) by thinning the relevant image.

The difference generator 306 generates the above-described difference at each pixel position.

The image selector 307 predetermines a threshold for the difference, and compares the threshold with the difference obtained by the difference generator 306.

Figure 6:
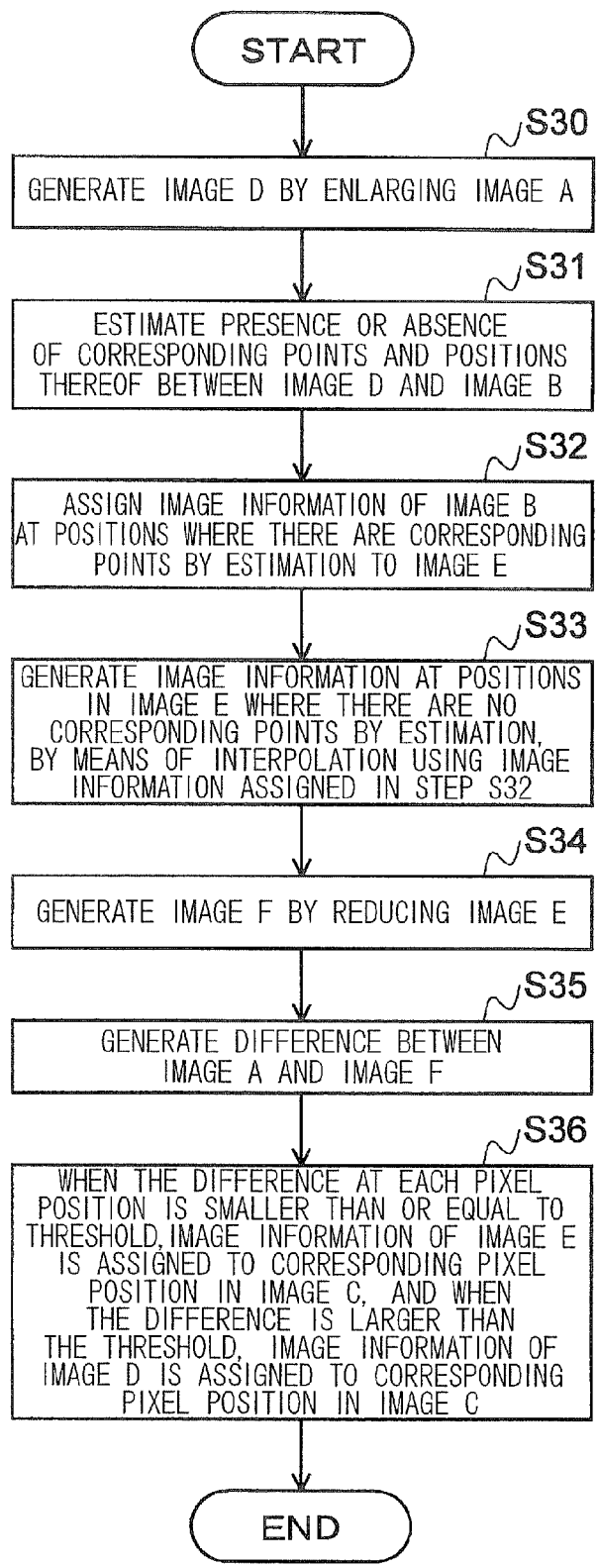
FIG. 6 is a flowchart showing the operation of the image generation apparatus of the embodiment.

Based on the above premise, the image generation apparatus operates as explained below. FIG. 6 is a flowchart showing the operation.

First, the image enlarging unit 301 generates image D by enlarging image A as described above (see step S30). The corresponding point estimator 302 estimates the presence or absence of the corresponding points and positions thereof between image D and image B (see step S31).

The corresponding image assigning unit 303 assigns image information of each position in image B, for which the corresponding point estimator 302 estimates that there is a corresponding point, to image E (see step S32). For each position for which the corresponding point estimator 302 estimates that there is no corresponding point, the image interpolator 304 generates image information of image E by means of interpolation using the image information which was already assigned by the corresponding image assigning unit 303 (see step S33).

The image reducing unit 305 generate image F by reducing image E (see step S34). The difference generator 306 generates the difference between image A and image F (see step S35).

In accordance with the difference obtained by the difference generator 306, the image selector 307 selects image F or image D for each pixel position, so as to generate image C (see step S36).

The image reducing unit 305 may generate the reduced image by using another method.

The difference generator 306 may generate a difference between blocks, where the target pixel is positioned at the center of each block (refer to the first embodiment).

In the image selector 307 of the present embodiment, (i) when the difference at each pixel position computed by the difference generator 306 is small, the relevant image information of image E is assigned to each corresponding pixel position in image C, and when the difference at each pixel position computed by the difference generator 306 is large, the relevant image information of image D is assigned to each corresponding pixel position in image C. In place of the image selector 307, an image generator may be provided.

Figure 7:
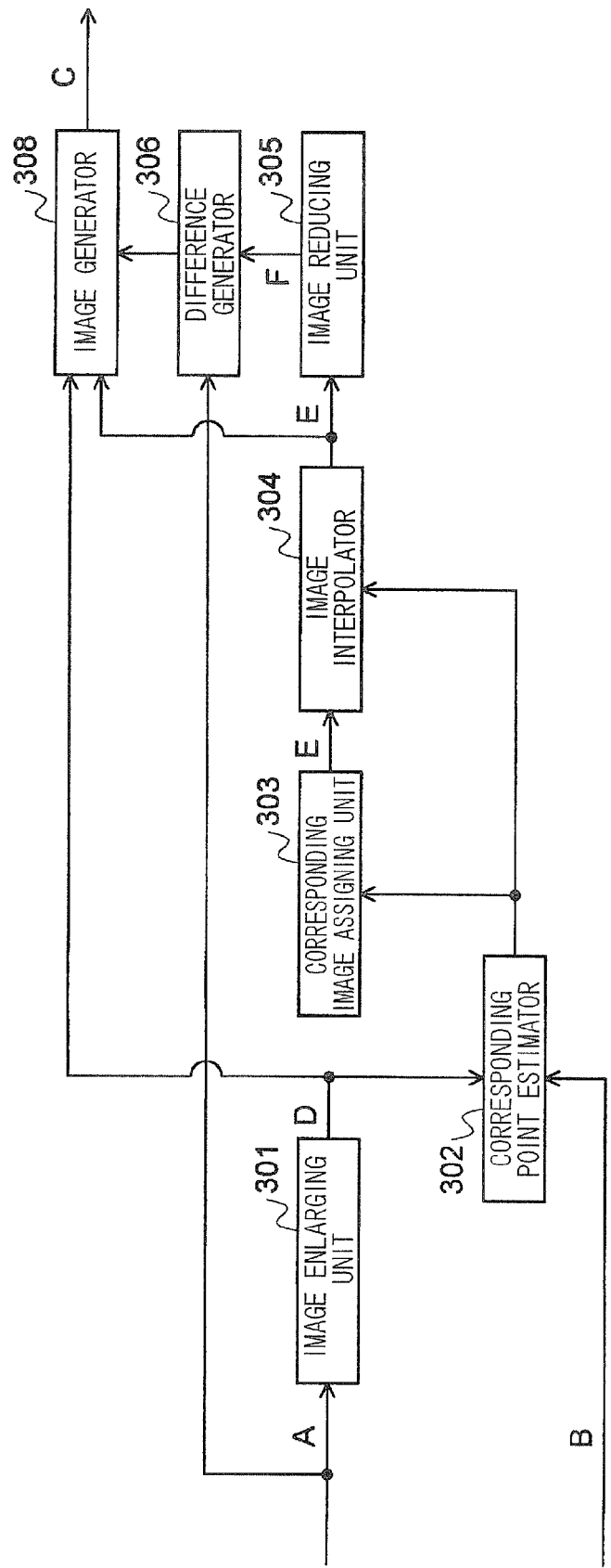
FIG. 7 is a diagram showing the structure of an image generation apparatus as a variation of the embodiment.

FIG. 7 shows a general structure of the relevant apparatus. In the case shown in FIG. 7, (i) when the difference at each pixel position computed by the difference generator 306 is small, the image generator 308 assigns the relevant image information of image E to each corresponding pixel position in image C, and (ii) when the difference at each pixel position computed by the difference generator 306 is large, the generator 308 assigns a value obtained by weighted averaging between the relevant image information of image D and the relevant image information of image E to each corresponding pixel position in image C.

In accordance with the above method, when the difference is large, not the enlarged image D (having a high resolution), but a weighted average between the enlarged image D and image E generated using another image can be used. This method is preferable when the high-frequency component of the enlarged image D is small.

Fourth Embodiment

In a fourth embodiment, there are images A and B which were obtained by a common camera and have the same resolution, and an image C close to image A is generated using a reduced image of image A and image B. Here, generated image information is applied only to each pixel position at which difference between a reduced image of the original image A and an image obtained by reducing the generated image information is small. The present embodiment also has a distinctive feature of estimating a threshold applied to the difference between two images at each pixel position.

Figure 8:
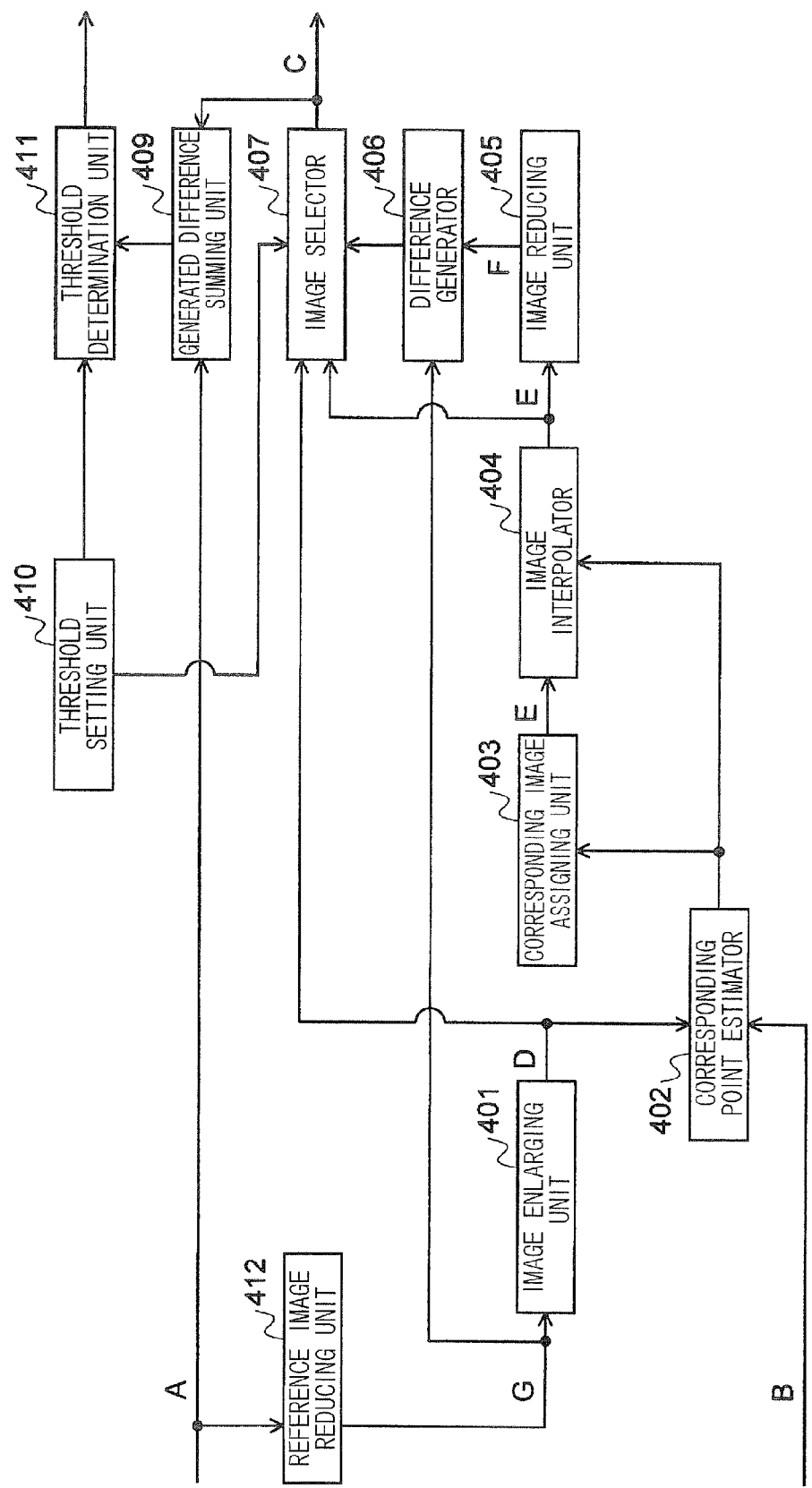
FIG. 8 is a diagram showing the structure of an image generation apparatus as a fourth embodiment of the present invention.

FIG. 8 shows a general structure of the apparatus. That is, the image generation apparatus of the present embodiment has:

(i) a reference image reducing unit 412 for reducing image A so as to generate an image G having a low resolution, and an image enlarging unit 401 for enlarging image G so as to generate an image D having the same resolution as images A and B, (ii) a corresponding point estimator 402 for estimating presence or absence of a point in image B corresponding to each pixel position of image D and also estimating the position of the relevant corresponding point, (iii) a corresponding image assigning unit 403 for assigning, to a pixel position in an image E (temporary image (for processing) having the same size as image D) equal to each pixel position in image D for which the corresponding point estimator 402 estimates that there is a corresponding point, image information of the corresponding position in image B, (iv) an image interpolator 404 for generating image information at a pixel position in image E equal to each pixel position in image D for which the corresponding point estimator 402 estimates that there is no corresponding point, by using the image information assigned by the corresponding image assigning unit 403, (v) an image reducing unit 405 for reducing image E so as to generate image F (having the same resolution as image G), (vi) a difference generator 406 for computing a difference between image information at each pixel position in image G and image information at the same pixel position in image F, (vii) a threshold setting unit 410 for setting a plurality of thresholds within a predetermined range, (viii) an image selector 407, wherein for each threshold set by the threshold setting unit 410, when the difference at each pixel position computed by the difference generator 406 is smaller than or equal to a threshold, the image selector 407 assigns the relevant image information of image E to each corresponding pixel position in image C, and when the difference at each pixel position computed by the difference generator 406 is larger than the threshold, the image selector 407 assigns the relevant image information of image D to each corresponding pixel position in image C, (ix) a generated difference summing unit 409 for computing the sum of differences in image information at the relevant pixel positions between image C obtained by the image selector 407 and image A, and (x) a threshold determination unit 411 for determining the threshold which produces the minimum value in the sums of the differences computed by the generated difference summing unit 409.

The threshold setting unit 410 increases the threshold by increments of 10 from 10 to 50.

Figure 9:
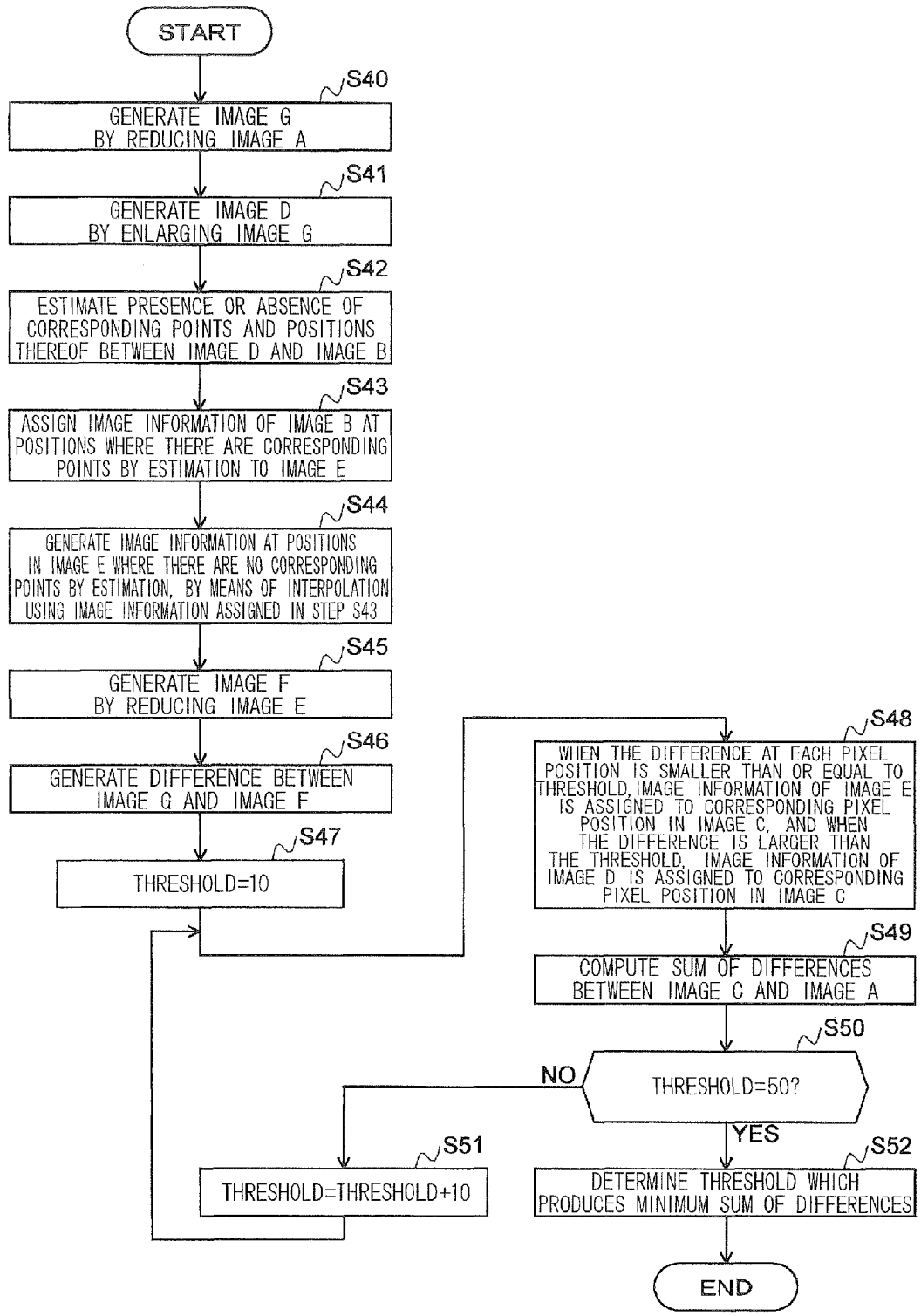
FIG. 9 is a flowchart showing the operation of the image generation apparatus of the embodiment.

Based on the above premise, the image generation apparatus operates as explained below. FIG. 9 is a flowchart showing the operation.

First, the reference image reducing unit 412 generates image G having a low resolution by reducing image A (see step S40)

The image enlarging unit 401 generates image D having a high resolution (i.e., the same resolution as images A and B) by enlarging image G (see step S41).

The corresponding point estimator 402 estimates the presence or absence of the corresponding points and positions thereof between image D and image B (see step S42).

The corresponding image assigning unit 403 assigns image information of each position in image B, for which the corresponding point estimator 402 estimates that there is a corresponding point, to image E (see step S43).

For each position for which the corresponding point estimator 402 estimates that there is no corresponding point, the image interpolator 404 generates image information of image E by means of interpolation using the image information which was already assigned by the corresponding image assigning unit 403 (see step S44).

The image reducing unit 405 generate image F having the low resolution by reducing image B (see step S45).

The difference generator 406 generates differences between image G and image F (see step S46).

Next, the threshold setting unit 410 sets the threshold to 10 (see step S47).

The image selector 407 compares the difference obtained by the difference generator 406 with the threshold, and selects image E or image D for each pixel position, so as to generate image C (see step S48).

The generated difference summing unit 409 computes the sum of the differences between image C and image A (see step S49).

The above operation executed by the threshold setting unit 410, the image selector 407, and the generated difference summing unit 409 is repeatedly performed while increasing the threshold by increments of 10 up to 50 (see steps S50 and S51).

Next, the threshold determination unit 411 determines the threshold which produces the minimum value obtained by the generated difference summing unit 409 (see step S52).

In the above structure, an image generator may be used in place of the image selector 407. The general structure of the relevant apparatus is shown in FIG. 10.

Figure 10:
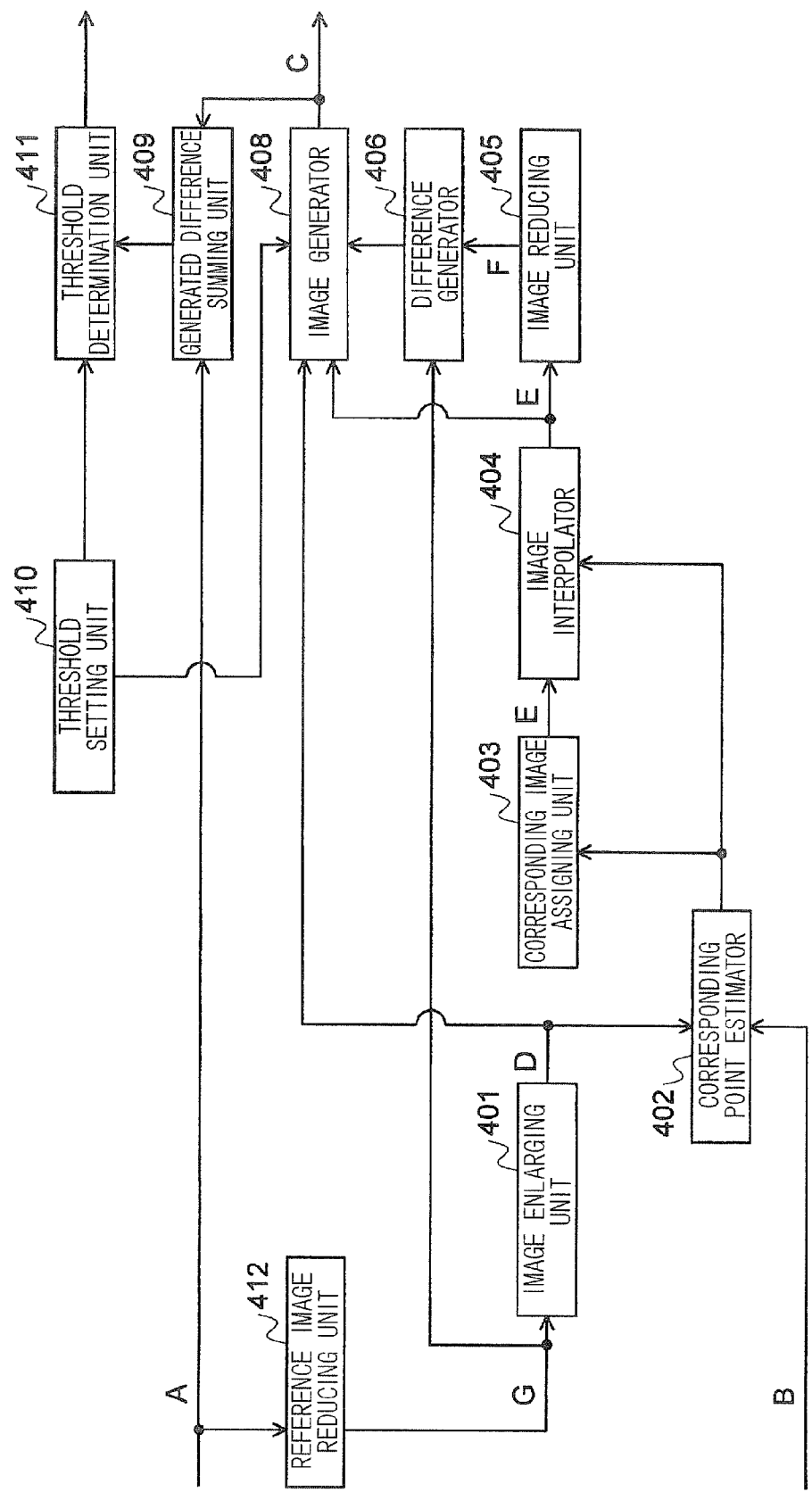
FIG. 10 is a diagram showing the structure of an image generation apparatus as a variation of the embodiment.
Figure 11:
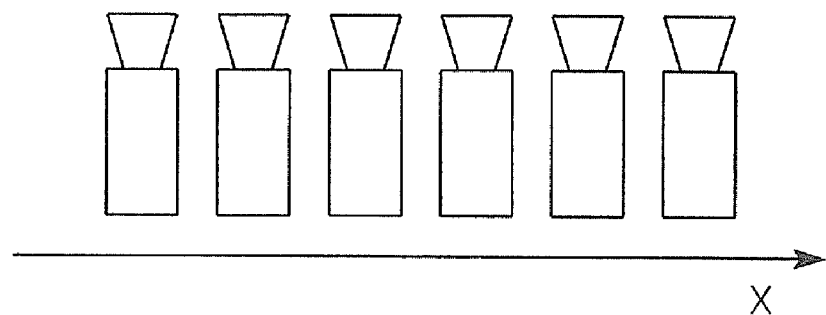
FIG. 11 is a diagram showing a multi-view imaging system having a straight-line alignment.
Figure 12:
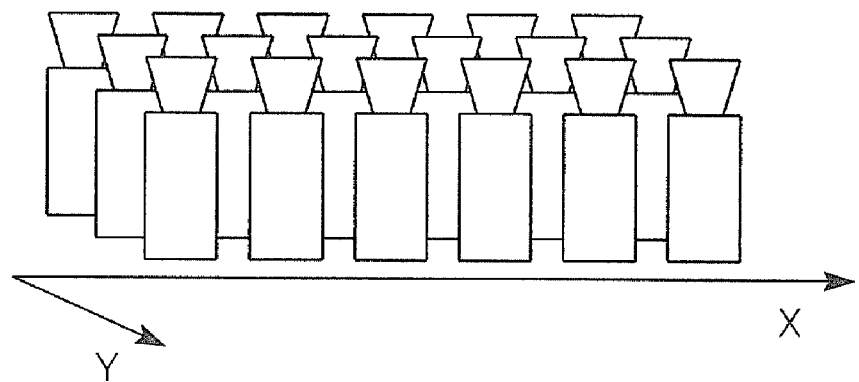
FIG. 12 is a diagram showing a multi-view imaging system having a planar arrangement.
Figure 13:
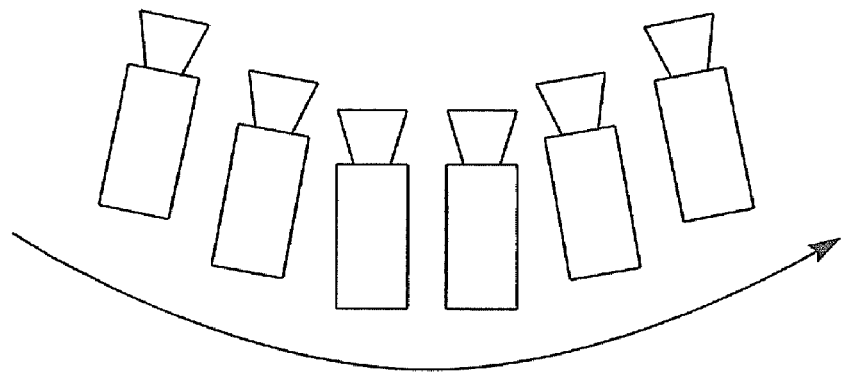
FIG. 13 is a diagram showing a multi-view imaging system having an arc arrangement.
Figure 14:
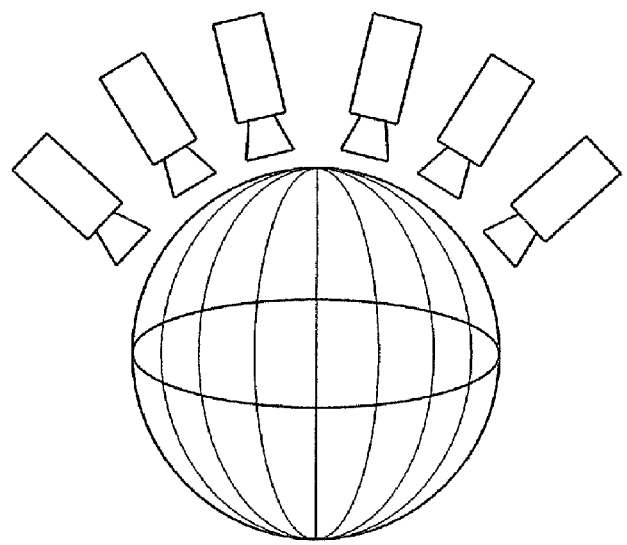
FIG. 14 is a diagram showing a multi-view imaging system having a spherical arrangement.

In the image generator 408 shown in FIG. 10, (i) when the difference at each pixel position obtained by the difference generator 406 is small, the relevant image information of image E is assigned to the corresponding pixel position in image C, and (ii) when the difference at each pixel position obtained by the difference generator 406 is large, a value obtained by weighted averaging between the relevant image information of image D and the relevant image information of image E to the corresponding pixel position in image C.

In the above-described embodiments, operations for input images by a plurality of cameras were explained. However, the relevant methods can be applied, not only to such a multi-view image, but also to a video image by a single camera.

That is, if the resolution of each frame in a video image is not constant, an image having a high resolution corresponding to an image of a frame having a low resolution can be generated using an image of another frame having the high resolution.

In an example of the application, an image C having a high resolution is generated using an image A of a frame having a low resolution and an image B of another frame having the high resolution.

In addition, although the signal Y is processed in the above embodiments, another color signal such as RGB may be processed.

The relevant methods can also be applied to a case in that in the YUV signal, the signal Y has a constant resolution, but the signals U and V have non-constant resolutions. In such a case, the enlargement by an image enlarging unit is applied only to the signals U and V, and the signal Y is copied unchanged. The estimation by a corresponding point estimator may by performed, not using a signal having an increased resolution based on the signal U or V, but using the signal Y.

The above-described image generating operation can also be implemented by a computer and a software program. Such a computer program may be provided by storing it in a computer-readable storage medium, or by means of a network.

INDUSTRIAL APPLICABILITY

In accordance with the present invention, for image information obtained at a camera position having a low resolution, image information having a high resolution can be generated using image information obtained at a camera position having a high resolution, thereby reducing degradation in the subjective image quality.

The invention claimed is:

1. An image generation method for generating image information of a third image C by using a first image A and a second image B having a resolution higher than that of image A, the method comprising:
    an image enlarging step that generates the third image C having the same resolution as image B by enlarging the first image A;
    a corresponding point estimating step that estimates presence or absence of a point in the second image B corresponding to each pixel position of the third image C and also estimates the position of the relevant corresponding point; and
    a corresponding image assigning step that assigns, to each pixel position in the third image C for which the corresponding point estimating step estimates that there is a corresponding point, image information of the corresponding position in the second image B.

2. The image generation method in accordance with claim 1, further comprising:
    an image interpolation step that generates image information at each pixel position in the third image C for which the corresponding point estimating step estimates that there is no corresponding point, by means of interpolation using the image information assigned by the corresponding image assigning step.

3. An image generation method for generating image information of a third image C by using a first image A and a second image B having a resolution higher than that of image A, the method comprising:
    an image enlarging step that generates a fourth image D having the same resolution as image B by enlarging the first image A;
    a corresponding point estimating step that estimates presence or absence of a point in the second image B corresponding to each pixel position of the fourth image D and also estimates the position of the relevant corresponding point;
    a corresponding image assigning step that assigns, to a pixel position in a fifth image E equal to each pixel position in the fourth image D for which the corresponding point estimating step estimates that there is a corresponding point, image information of the corresponding position in the second image B;
    an image interpolation step that generates image information at a pixel position in the fifth image E equal to each pixel position in the fourth image D for which the corresponding point estimating step estimates that there is no corresponding point, by means of interpolation using the image information assigned by the corresponding image assigning step;
    an image reducing step that generates a sixth image F having the same resolution as image A by reducing the fifth image E;
    a difference generating step that computes a difference between image information at each pixel position in the first image A and image information at the same pixel position in the sixth image F; and
    an image information assigning step wherein:
    when the difference at each pixel position computed by the difference generating step is smaller than or equal to a threshold, the image information assigning step assigns image information of the fifth image E to each corresponding pixel position in the third image C, and,
    when the difference at each pixel position computed by the difference generating step is larger than the threshold, the image information assigning step assigns image information based on image information of the fourth image D to each corresponding pixel position in the third image C.

4. The image generation method in accordance with claim 3, wherein when the difference at each pixel position computed by the difference generating step is larger than the threshold, the image information assigning step assigns the image information of the fourth image D to each corresponding pixel position in the third image C.

5. The image generation method in accordance with claim 3, wherein when the difference at each pixel position computed by the difference generating step is larger than the threshold, the image information assigning step assigns a weighted average between the image information of the fourth image D and the image information of the fifth image E to each corresponding pixel position in the third image C.

6. An image generation method for generating image information of a third image C by using a first image A and a second image B which have the same resolution, and also using fourth to seventh images D to G, the method comprising:
    a reference image reducing step that generates the seventh image G having a resolution lower than that of the first image A by reducing image A;
    an image enlarging step that generates the fourth image D having the same resolution as image A by enlarging the seventh image G;
    a corresponding point estimating step that estimates presence or absence of a point in the second image B corresponding to each pixel position of the fourth image D and also estimates the position of the relevant corresponding point;
    a corresponding image assigning step that assigns, to a pixel position in the fifth image E equal to each pixel position in the fourth image D for which the corresponding point estimating step estimates that there is a corresponding point, image information of the corresponding position in the second image B;
    an image interpolation step that generates image information at a pixel position in the fifth image E equal to each pixel position in the fourth image D for which the corresponding point estimating step estimates that there is no corresponding point, by means of interpolation using the image information assigned by the corresponding image assigning step;
    an image reducing step that generates the sixth image F having the same resolution as image G by reducing the fifth image E;
    a difference generating step that computes a difference between image information at each pixel position in the seventh image G and image information at the same pixel position in the sixth image F;

a threshold setting step that sets a threshold;

an image information assigning step wherein:

when the difference at each pixel position computed by the difference generating step is smaller than or equal to a threshold, the image information assigning step assigns image information of the fifth image E to each corresponding pixel position in the third image C, and, when the difference at each pixel position computed by the difference generating step is larger than the threshold, the image information assigning step assigns image information based on image information of the fourth image D to each corresponding pixel position in the third image C;

a generated difference summing step that computes the sum of differences in image information at the relevant pixel positions between the third image C obtained by the image information assigning step and the first image A; and a threshold determination step that determines the threshold which produces the minimum value in the sums of the differences computed by the generated difference summing step based on a result of repetition of the image information assigning step and the generated difference summing step while changing the threshold set by the threshold setting step within a predetermined range.

7. The image generation method in accordance with claim 6, wherein when the difference at each pixel position computed by the difference generating step is larger than the threshold, the image information assigning step assigns the image information of the fourth image D to each corresponding pixel position in the third image C.

8. The image generation method in accordance with claim 6, wherein when the difference at each pixel position computed by the difference generating step is larger than the threshold, the image information assigning step assigns a weighted average between the image information of the fourth image D and the image information of the fifth image E to each corresponding pixel position in the third image C.

9. An image generation apparatus for generating image information of a third image C by using a first image A and a second image B having a resolution higher than that of image A, the apparatus comprising:

an image enlarging unit that generates the third image C having the same resolution as image B by enlarging the first image A;

a corresponding point estimating unit that estimates presence or absence of a point in the second image B corresponding to each pixel position of the third image C and also estimates the position of the relevant corresponding point; and a corresponding image assigning unit that assigns, to each pixel position in the third image C for which the corresponding point estimating unit estimates that there is a corresponding point, image information of the corresponding position in the second image B.

10. The image generation apparatus in accordance with claim 9, further comprising:

an image interpolation unit that generates image information at each pixel position in the third image C for which the corresponding point estimating unit estimates that there is no corresponding point, by means of interpolation using the image information assigned by the corresponding image assigning unit.

11. An image generation apparatus for generating image information of a third image C by using a first image A and a second image B having a resolution higher than that of image A, the apparatus comprising:

an image enlarging unit that generates a fourth image D having the same resolution as image B by enlarging the first image A;

a corresponding point estimating unit that estimates presence or absence of a point in the second image B corresponding to each pixel position of the fourth image D and also estimates the position of the relevant corresponding point;

a corresponding image assigning unit that assigns, to a pixel position in a fifth image E equal to each pixel position in the fourth image D for which the corresponding point estimating unit estimates that there is a corresponding point, image information of the corresponding position in the second image B;

an image interpolation unit that generates image information at a pixel position in the fifth image E equal to each pixel position in the fourth image D for which the corresponding point estimating unit estimates that there is no corresponding point, by means of interpolation using the image information assigned by the corresponding image assigning unit;

an image reducing unit that generates a sixth image F having the same resolution as image A by reducing the fifth image E;

a difference generating unit that computes a difference between image information at each pixel position in the first image A and image information at the same pixel position in the sixth image F; and an image information assigning unit wherein:

when the difference at each pixel position computed by the difference generating unit is smaller than or equal to a threshold, the image information assigning unit assigns image information of the fifth image E to each corresponding pixel position in the third image C, and, when the difference at each pixel position computed by the difference generating unit is larger than the threshold, the image information assigning unit assigns image information based on image information of the fourth image D to each corresponding pixel position in the third image C.

12. The image generation apparatus in accordance with claim 11, wherein when the difference at each pixel position computed by the difference generating unit is larger than the threshold, the image information assigning unit assigns the image information of the fourth image D to each corresponding pixel position in the third image C.

13. The image generation apparatus in accordance with claim 11, wherein when the difference at each pixel position computed by the difference generating unit is larger than the threshold, the image information assigning unit assigns a weighted average between the image information of the fourth image D and the image information of the fifth image E to each corresponding pixel position in the third image C.

14. An image generation apparatus for generating image information of a third image C by using a first image A and a second image B which have the same resolution, and also using fourth to seventh images D to G, the apparatus comprising:

a reference image reducing unit that generates the seventh image G having a resolution lower than that of the first image A by reducing image A;

an image enlarging unit that generates the fourth image D having the same resolution as image A by enlarging the seventh image G;

a corresponding point estimating unit that estimates presence or absence of a point in the second image B corresponding to each pixel position of the fourth image D and also estimates the position of the relevant corresponding point;

a corresponding image assigning unit that assigns, to a pixel position in the fifth image E equal to each pixel position in the fourth image D for which the corresponding point estimating unit estimates that there is a corresponding point, image information of the corresponding position in the second image B;

an image interpolation unit that generates image information at a pixel position in the fifth image E equal to each pixel position in the fourth image D for which the corresponding point estimating unit estimates that there is no corresponding point, by means of interpolation using the image information assigned by the corresponding image assigning unit;

an image reducing unit that generates the sixth image F having the same resolution as image G by reducing the fifth image E;

a difference generating unit that computes a difference between image information at each pixel position in the seventh image G and image information at the same pixel position in the sixth image F;

a threshold setting unit that sets a threshold;

an image information assigning unit wherein:

when the difference at each pixel position computed by the difference generating unit is smaller than or equal to a threshold, the image information assigning unit assigns image information of the fifth image E to each corresponding pixel position in the third image C, and, when the difference at each pixel position computed by the difference generating unit is larger than the threshold, the image information assigning unit assigns image information based on image information of the fourth image D to each corresponding pixel position in the third image C;

a generated difference summing unit that computes the sum of differences in image information at the relevant pixel positions between the third image C obtained by the image information assigning unit and the first image A; and a threshold determination unit that determines the threshold which produces the minimum value in the sums of the differences computed by the generated difference summing unit based on a result of repetition of operations of the image information assigning unit and the generated difference summing unit while changing the threshold set by the threshold setting unit within a predetermined range.

15. The image generation apparatus in accordance with claim 14, wherein when the difference at each pixel position computed by the difference generating unit is larger than the threshold, the image information assigning unit assigns the image information of the fourth image D to each corresponding pixel position in the third image C.

16. The image generation apparatus in accordance with claim 14, wherein when the difference at each pixel position computed by the difference generating unit is larger than the threshold, the image information assigning unit assigns a weighted average between the image information of the fourth image D and the image information of the fifth image E to each corresponding pixel position in the third image C.

17. An image generation program by which a computer executes the image generation method in accordance with claim 1.

18. A computer-readable storage medium which stores an image generation program by which a computer executes the image generation method in accordance with claim 1.

19. An image generation program by which a computer executes the image generation method in accordance with claim 3.

20. A computer-readable storage medium which stores an image generation program by which a computer executes the image generation method in accordance with claim 3.

21. An image generation program by which a computer executes the image generation method in accordance with claim 6.

22. A computer-readable storage medium which stores an image generation program by which a computer executes the image generation method in accordance with claim 6.

* * * * *